Patented Oct. 4, 1932

1,880,564

UNITED STATES PATENT OFFICE

THEODOR WEIGEL, OF COLOGNE-MULHEIM, GERMANY, ASSIGNOR TO I. G. FARBEN-INDUSTRIE AKTIENGESELLSCHAFT, OF FRANKFORT-ON-THE-MAIN, GERMANY

MANUFACTURE OF DITHIOCARBAMATES

No Drawing. Application filed August 2, 1930, Serial No. 472,765, and in Germany August 8, 1929.

The present invention relates to an improvement in the manufacture of dithiocarbamates from sparingly water soluble primary or secondary amines with carbon bisulfide, which improvement consists in performing the reaction in an aqueous emulsion of the respective amine, and in the presence of a suitable emulsifying agent.

The manufacture of dithiocarbamates from carbon bisulfide and amines in an aqueous medium can only be carried out smoothly when the amine or the reaction product (dithiocarbamate) are soluble in water; however, when both are insoluble or sparingly soluble in water the dithiocarbamate formed easily occludes unconverted amine, thus removing the latter from the reaction with carbon bisulfide. The reaction product consequently contains the occluded amine as a harmful impurity, reducing the stability of the former. In cases of this kind it has hitherto been necessary to work in an organic solvent, which is expensive and difficult to remove from the reaction products.

In accordance with the present invention reactions between primary or secondary aliphatic, hydroaromatic, or aralkyl amines sparingly soluble in water and carbon bisulfide can be carried out smoothly by emulsifying the amine in water with the aid of a water soluble emulsifying agent which is inert to the starting materials (soap, salts of alkylated naphthalene sulfonic acids and the like) and causing the reaction with carbon bisulfide to proceed in this emulsion.

The reaction is advantageously performed while slowly adding the carbon bisulfide in the theoretical amount or in a small excess to the aqueous emulsion of the amine, at normal temperature. In some cases cooling of the reaction mixture will be advantageous.

The following examples will illustrate my invention without restricting it thereto.

Example 1

129 parts by weight of dibutylamine are emulsified with 150 parts by weight of a 10% aqueous sodium oleate solution. On the gradual addition of 39 parts by weight of carbon bisulfide the dibutylamine salt of dibutyldithiocarbamic acid separates out in the form of fine crystals in a yield of 165 parts by weight. The product corresponds to the probable formula:—

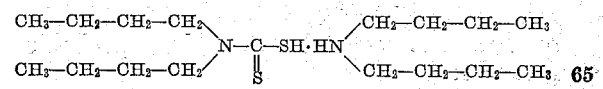

Example 2

72 parts by weight of dicyclohexyl amine are emulsified with 100 parts by weight of a 10% aqueous soap solution. The dicyclohexyl amine salt of dicyclohexyl-dithiocarbamic acid separates from this emulsion on the gradual addition of 16 parts by weight of carbon bisulfide in a yield of 84 parts by weight. The product corresponds to the probable formula:—

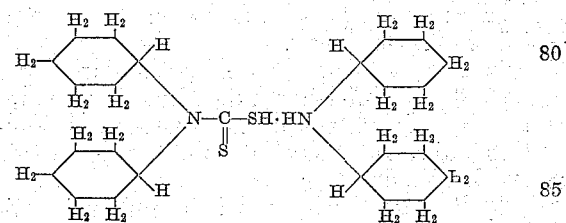

Example 3

50 parts by weight of dibenzylamine are emulsified with 100 parts by weight of a 10% aqueous soap solution. The dibenzylamine salt of dibenzyldithiocarbamic acid separates from this emulsion on the gradual addition of 10.5 parts by weight of carbon bisulfide in a yield of 55 parts by weight. The product corresponds to the probable formula:—

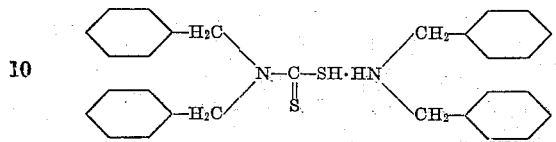

*Example 4*

14.7 parts by weight of alicyclic tetrahydro-beta-naphthylamine are emulsified with 50 parts by weight of a 10% aqueous soap solution. By the addition of 4 parts by weight of carbon bisulfide the ac-tetrahydro-beta-naphthylamine salt of tetrahydro-beta-naphthyldithiocarbamic acid separates in a yield of 17 parts by weight. The product corresponds to the probable formula:—

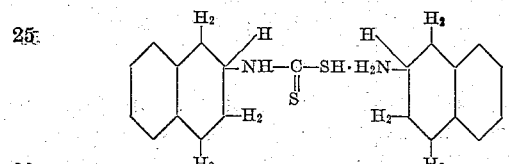

*Example 5*

22.6 parts by weight of hexahydro-paratoluidine are emulsified with 100 ccms. of a 5% aqueous soap solution. By the addition of 8 parts by weight of carbon bisulfide the hexahydro-para-toluidine salt of para-methyl-cyclohexyl-dithiocarbamic acid separates in a yield of 29 parts by weight. The product corresponds to the probable formula:—

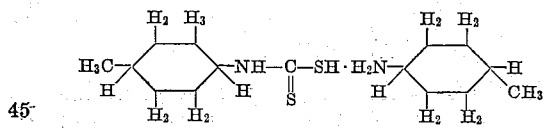

I claim:—

1. Process which comprises emulsifying a compound of the group consisting of sparingly water soluble aliphatic, hydroaromatic and aralkyl-amines with water with the aid of a water soluble emulsifying agent which is chemically indifferent to the starting materials; and causing carbon bisulfide to enter this emulsion slowly.

2. Process which comprises emulsifying a secondary aliphatic amine which is sparingly soluble in water with an aqueous soap solution and causing carbon bisulfide to enter this emulsion slowly.

3. Process which comprises emulsifying dibutylamine with water and an aqueous soap solution and causing carbon bisulfide to enter this emulsion slowly.

4. Process which comprises emulsifying 129 parts by weight of dibutylamine with 150 parts by weight of a 10% aqueous sodium oleate solution and slowly adding 39 parts by weight of carbon bisulfide.

In testimony whereof, I affix my signature.
THEODOR WEIGEL.